May 24, 1938. F. J. CHAMPLIN Re. 20,734

ELECTRICAL REGULATION

Original Filed May 14, 1935

Inventor:
Franklin J. Champlin,
by Harry E. Dunham
His Attorney.

Reissued May 24, 1938

Re. 20,734

UNITED STATES PATENT OFFICE 20,734

ELECTRICAL REGULATION

Franklin J. Champlin, Dalton, Mass., assignor to General Electric Company, a corporation of New York Original No. 2,022,537, dated November 26, 1935, Serial No. 21,312, May 14, 1935. Application for reissue November 26, 1937, Serial No. 176,701

11 Claims. (Cl. 171—119)

Figure 1:
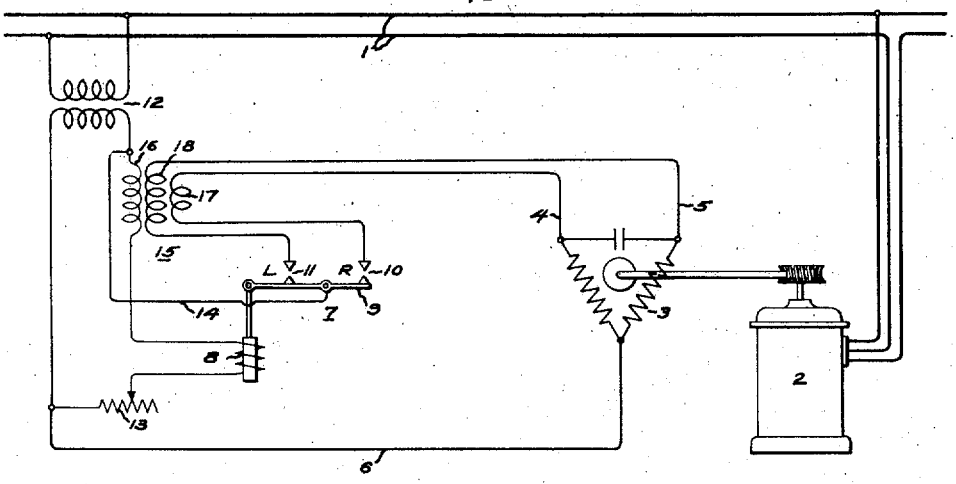

My invention relates to electrical regulation and more particularly to improvements in the control of electromagnetically operated contact making controllers for regulating systems.

Many electrical regulating systems are controlled by a master contact making device. Such a device is usually a solenoid actuated element having a contact beam provided with a set of "raise" contacts and a set of "lower" contacts which are closed, respectively, when the quantity to be regulated falls below or exceeds, by a predetermined amount, a normal value. Heretofore, it has been customary to provide such contact making devices with holding coils, one or the other of which is energized whenever the device closes a set of contacts and the effect of the holding coils is to produce a bias in the meter tending to hold the contacts relatively firmly together so as to prevent chattering of the contacts.

In accordance with my invention, I provide a novel and simple control arrangement for such contact making devices which permits the elimination of conventional holding coils. This result is accomplished by varying the energization of the main operating winding of the contact making device, whenever one or the other of its contacts closes, in such a way as to produce an effect which is the equivalent of the ordinary holding coil effect.

Many regulators controlled by contact making voltmeters are operated by reversible electric motors. When there is no convenient auxiliary source of current supply for energizing these motors it as been the practice to connect them to be energized by the same voltage or potential transformer from which the main operating winding of the contact making voltmeter is energized. Due, however, to the fact that the motor draws a relatively large current with respect to the current required by the contact making voltmeter, an ojectionable voltage drop, due to the motor current, is produced in the potential transformer and in order to eliminate the effect of this voltaged drop on the contact making voltmeter various means such, for example, as an auxiliary solenoid winding on the contact making voltmeter or a so-called stabilizing transformer has been employed to eliminate this effect. A stabilizing transformer is a small transformer which responds to the motor current and which induces in the contact making voltmeter operating winding circuit a voltage which is equal and opposite to the voltage drop produced by the motor current in the potential transformer. Although my invention is not limited thereto, I find it convenient in certain instances to combine my means for producing an equivalent holding coil effect with a stabilizing transformer for in this way the number of separate parts required in the system is materially reduced.

An object of my invention is to provide a new and improved system of control for electrical regulating systems.

Another object of my invention is to provide an arrangement for eliminating holding coils on contact making voltmeters without otherwise changing their construction.

My invention will be better understood from the following description taken in connection with the accompanying drawing and its scope will be pointed out in the appended claims.

Figure 2:
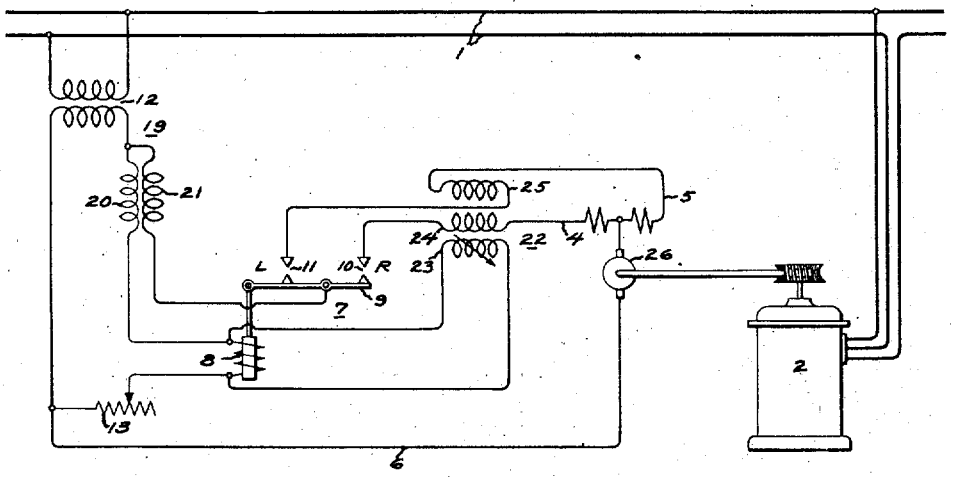
Figure 3:
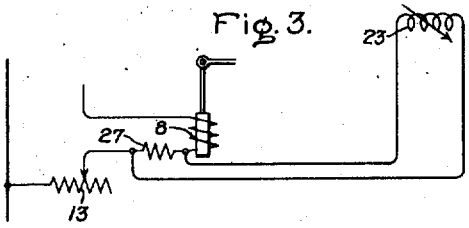

In the drawing, Fig. 1 illustrates diagrammatically an embodiment of my invention in which the means for producing the equivalent effect of holding coils is combined with the stabilizing transformer and produces this effect by varying the voltage applied to the main operating winding of the contact making voltmeter; Fig. 2 is a diagrammatic showing of a modification in which the means for producing the equivalent effect of holding coils is separate from the stabilizing transformer and circulates an auxiliary current in the operating winding of the contact making voltmeter; and Fig. 3 is a modification of Fig. 2 in which the auxiliary current is used to produce a voltage shown in the energizing circuit for the contact making voltmeter operating winding.

Referring now to Fig. 1 of the accompanying drawing 1 is a main alternating current circuit whose voltage is to be regulated by any suitable regulating means which is shown by way of example as induction voltage regulator 2. Connected for driving the regulator 2 is a reversible electric motor shown as a well known capacitor motor 3 having two directions of rotation controlling circuits 4 and 5 and a return conductor 6.

The proper energization of the reversing circuits 4 and 5 is controlled by a contact making voltmeter 7 having a main operating winding 8 which operates, through the conventional solenoid core, a pivoted contact beam 9 having a set of "raise" contacts 10 and a set of "lower" contacts 11, respectively. The main operating winding 8 is connected to be responsive to the voltage of circuit 1 by means of a potential transformer 12 across which the winding 8 is connected through a conventional series resistor 13. The motor 3 is also connected to be energized by the potential transformer 12. Thus the return conductor 6 is connected to one side of the secondary winding of transformer 12 and the reversing circuits 4 and 5, which are connected respectively to the "raise" and "lower" contacts 10, are connectible to the other side of the secondary winding of the potential transformer 12 by a conductor 14 connected to the contact beam 9.

Connected in the energizing circuit for the operating winding 8 and in the reversing circuits 4 and 5 for the motor 3 is a special transformer 15 having a secondary winding 16 connected in circuit with operating winding 8 and having individual primary windings 17 and 18 connected respectively in the reversing circuits 4 and 5.

The operation of Fig. 1 is as follows: The position of the parts represents a normal voltage condition on circuit 1. Assume now that for any reason the voltage of circuit 1 becomes too low and falls slightly below the normal value. Under these circumstances the energization of operating winding 8 is weakened thereby causing the solenoid core 8 to descend and resulting in the engagement of the "raise" contacts 10. A circuit is then completed from one side of the secondary winding of the potential transformer 12 through the conductor 14, "raise" contacts 10, primary winding 17 on transformer 15, circuit 4 for motor 3 and back through the return circuit 6 to the other side of the potential transformer. These connections are such as to cause the motor 3 to turn the regulator 2 in a direction to raise the voltage of circuit 1. The motor current flowing through the winding 17 induces a voltage in the secondary winding 16 and I make the relation between these windings such that this voltage which is induced in the winding 16 is opposite in direction to the voltage drop in the transformer 12 caused by the motor current but which is less than equal to this drop by an amount which produces on the winding 8 the equivalent of the conventional holding coil effect. In other words the voltage drop in the transformer 12 is not quite compensated so that the contact making voltmeter acts as though the voltage of circuit 1 were slightly lower than it actually is. This, of course, causes the "raise" contacts 10 to be held in engagement until the voltage of circuit 1 exceeds the ideal normal value by a slight amount. It will be seen that this is exactly the equivalent of the effect produced by a holding coil as the holding coil would tend to hold the contacts 10 together and thus would require a slight excess voltage applied to the winding 8 in order to cause the contacts to separate. This operation, like the conventional holding coil operation, has the advantage of tending to prevent chattering of the contacts. When the contacts 10 do separate at a voltage slightly above normal the motor is deenergized, the voltage drop in the transformer 12 disappears and the compensating voltage produced by the transformer 15 disappears so that a very slight increase in voltage is applied to the operating winding 8. This helps to bring the contact beam up to its normal midposition, which would be substantially horizontal as shown in the drawing.

If now the voltage of circuit 1 should become too high and exceed the predetermined normal value by any predetermined amount the increased energization of the contact making voltmeter will cause the lower contacts 11 to close. An energizing circuit for the motor 3 is then completed through the reversing connections 5 and through the primary winding 18 of the transformer 15. This connection causes the motor 3 to operate in the reverse direction to cause the regulator 2 to lower the voltage of circuit 1. The relation between the windings 18 and 16 of transformer 15 is such that the voltage induced in the winding 16 slightly overcompensates for the voltage drop in the transformer 12 produced by the motor current. Generally speaking, this overcompensation is about as much as the undercompensation produced by the primary winding 17. Thus there is applied to the winding 8 of the contact making voltmeter 7, when the lower contacts are closed, a voltage which is slightly in excess of the voltage drop produced in the transformer 12. This excess serves to hold the lower contacts firmly in engagement and produces an effect which corresponds to the ordinary holding coil effect. When the voltage of the circuit 1 falls slightly below the average or ideal normal value this excess energization of the winding 8 will be overcome and the contacts 11 will separate thereby stopping the motor. The voltage drop in transformer 12 and the voltage induced in the winding 16 will then disappear and the contact making voltmeter will return to its balanced midposition as shown in the drawing.

From the above it will be seen that by adding a single additional winding to the stabilizing transformer it is possible to eliminate entirely the conventional holding coils and the circuits for energizing them.

It is sometimes desirable to energize an indicating voltmeter in parallel with the operating winding of the contact making voltmeter, but due to the slight over and under compensating holding coil effect producing voltages in transformer 15 such a meter when connected in parallel with the winding 8 of Fig. 1 will not always read accurately. However, in the modification shown in Fig. 2 this difficulty is overcome by producing the holding coil effect by means of an auxiliary current which is circulated in the operating winding 8.

Fig. 2 differs from Fig. 1 in the following particulars: A conventional stabilizing transformer 19 is substituted for the special transformer 15 of Fig. 1. Transformer 19 has a secondary winding 20 connected in circuit with the operating winding 8 of the contact making voltmeter and has a primary winding 21 connected to carry the motor current whenever the motor is energized. This transformer is so designed as to produce a voltage in the contact making voltmeter energizing circuit which is equal and opposite to the voltage drop in the transformer 12 produced by the motor current. An auxiliary current transformer 22 also is provided. This transformer has a secondary winding 23 connected across the operating winding 8 of the contact making voltmeter and it has a pair of reversely acting primary windings 24 and 25 connected respectively in the reversing circuits 4 and 5 of the operating motor for the regulator. The remaining difference between the two figures is that a split field motor 26 is shown in Fig. 2 in place of the capacitor motor 3 of Fig. 1.

The transformer 22 is so constructed that depending upon which of the reversing circuits 4 or 5 is energized relatively small reverse currents are induced in the secondary winding 23 and these currents are circulated in the winding 8 so as to add or subtract from the current in this winding produced by the voltage of circuit 1.

This added or subtracted current is such as to produce the proper equivalent holding coil effect. For example, if the voltage of circuit 1 is low and the "raise" contacts 10 close, the winding 24 of the transformer 22 is energized and this produces a current in the secondary winding 23 which is in such direction as to subtract from the current in the winding 8 thereby in effect reducing the total energization of this winding and the amount of this reduction is such as to produce an equivalent holding coil effect. Likewise when the voltage circuit 1 is too high and the "lower" contacts 11 close the primary winding 25 will be energized and will produce a reverse current in the secondary winding 23 which current will add to the current already in the winding 8 an auxiliary current of an amount sufficient to produce an equivalent holding coil effect so as to hold the contacts 11 firmly in engagement. As shown in the drawing, winding 23 is adjustable so that the amount of equivalent holding coil effect can readily be adjusted.

Although in both Figs. 1 and 2, I have shown the contact making voltmeter contacts arranged to carry the motor current, it will of course be obvious to those skilled in the art that this is not necessary and if desired the usual and conventional auxiliary relay or relays may be interposed between the contact making voltmeter contacts and the motor circuits. In that case the primary windings 17 and 18 of transformer 15 of Fig. 1 or the primary windings 24 and 25 of the auxiliary current transformer 22 of Fig. 2 may either be connected in the contact making voltmeter contact circuits or in the motor circuits. I prefer to connect them in the contact circuits because the unavoidable time delay in the operation of the relay might allow the contacts to reopen before the motor current starts to flow.

In the modification shown in Fig. 3 the auxiliary current produced by winding 23 is passed through a resistor 27 and the resultant voltage drop affects the energization of winding 8 in such a manner as to produce the desired equivalent holding coil effect.

While I have shown and described particular embodiments of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States, is:

1. In combination, a contact making electroresponsive control device for a regulating system, and means responsive to the closing of the contacts of said device for varying its energization in a manner to produce an equivalent holding coil effect.

2. In combination, means having an operating condition to be regulated, means including a contact making device for regulating said condition, an operating winding for said device, and means including a transformer responsive to the closing of the contacts of said device for varying the energization of said operating winding by an amount corresponding to a proper holding coil effect.

3. In a voltage regulating system, in combination, an alternating current circuit, a potential transformer connected thereto, a contact making voltmeter having its operating winding connected to be energized by said transformer, a reversible alternating current motor having its direction of rotation determining circuits selectively connectible to said transformer and controlled by the contacts of said voltmeter, and means responsive to the currents in said circuits for causing the energization of said operating winding to vary in direction and amount enough to produce an equivalent holding coil effect while at the same time substantially compensating said winding for the effect of the voltage drop in said transformer caused by said motor current.

4. In a voltage regulating system, an electric circuit, a regulator controlling contact making voltmeter having an operating winding connected to respond to the voltage of said circuit, and a transformer connected to be energized when said contact making voltmeter closes its contacts for producing a voltage change with respect to said operating winding which produces the equivalent of a proper holding coil effect.

5. In a voltage regulating system, in combination, an alternating current circuit, a potential transformer connected thereto, a contact making voltmeter having a set of "raise" contacts, a set of "lower" contacts and an operating winding connected to be energized by said transformer so as to close the set of "raise" contacts when the voltage of said circuit is below a predetermined amount and to close said set of "lower" contacts when the voltage of said circuit is above a predetermined amount, a reversible motor having two circuits connectible selectively to said transformer by means of said "raise" and "lower" contacts, respectively, and a transformer having a secondary winding connected in circuit with said contact making voltmeter operating winding and having two primary windings connected respectively to respond to the contact current when said "raise" and "lower" contacts close, the primary winding which is energized when said "raise" contacts close inducing a voltage in the said secondary winding which is less than the motor current produced voltage drop in said potential transformer by an amount corresponding to a desired holding coil effect, the other primary winding when it is energized inducing in said secondary winding a voltage which exceeds said voltage drop by an amount corresponding to a desired holding coil effect.

6. In a voltage regulating system, in combination, an electric circuit, a regulator controlling contact making voltmeter having an operating winding connected to respond to the voltage of said circuit, and a transformer connected to be energized when said contact making voltmeter closes its contacts for circulating in said operating winding an auxiliary current for producing an equivalent holding coil effect.

7. In a voltage regulating system, in combination, an alternating current circuit, a potential transformer connected thereto, a contact making voltmeter having two sets of contacts and an operating winding connected to be energized by said transformer so as selectively to close said sets of contacts depending upon whether the voltage of said circuit is too high or too low, a two circuit reversible regulator operating motor connected to be energized by said transformer and to have its direction of rotation controlling circuits selectively energized by the closure of said respective sets of contacts, a transformer connected to be responsive to the current required by said motor for compensating said contact making voltmeter winding for the voltage drop in said potential transformer produced by the motor current, and a current transformer having a secondary winding connected to said contact making voltmeter operating winding and having two primary windings connected respectively in the contact circuits, the primary winding which is energized when the voltage is too high inducing a current in the secondary winding which adds to the current in the contact making voltmeter operating winding an amount sufficient to produce an equivalent holding coil effect, the other primary winding when it is energized inducing a like current in the opposite direction in said secondary winding.

8. In a voltage regulating system, in combination, an electric circuit, a regulator controlling contact making voltmeter having an operating winding connected to respond to the voltage of said circuit, and a transformer connected to be energized when said contact making voltmeter closes its contacts for causing a voltage drop in the circuit of said operating winding for producing an equivalent holding coil effect, 9. In combination, a contact-making voltmeter having a set of control contacts, auxiliary means having a winding whose energization is controlled by said contacts, and means energized by transformer action from said winding for causing said contacts to be held firmly in engagement when said winding is energized.

10. In an automatic regulator system, a regulator of a variable quantity, a primary relay responsive to said quantity for controlling said regulator, and means energized by transformer action and controlled by said relay for holding the contacts of said relay in relatively firm engagement in response to the engagement of said contacts.

11. In a regulator system, a contact-making voltmeter having a normal position and a contact-making position, a source of current supply, a winding connected in circuit with said source of current supply and the contacts of said contact-making voltmeter, a second winding inductively related to said first-mentioned winding and adapted to be energized by transformer action from said first winding, and means energized by said second winding for producing a holding effect which tends to maintain said contact-making voltmeter in its contact-making position.

FRANKLIN J. CHAMPLIN.